May 8, 1951 B. R. VENT 2,552,021
OPTICIAN'S STRAP PLIERS
Filed April 10, 1946 2 Sheets-Sheet 1
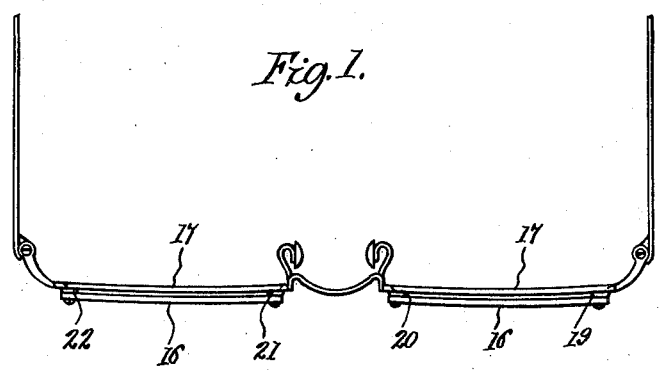
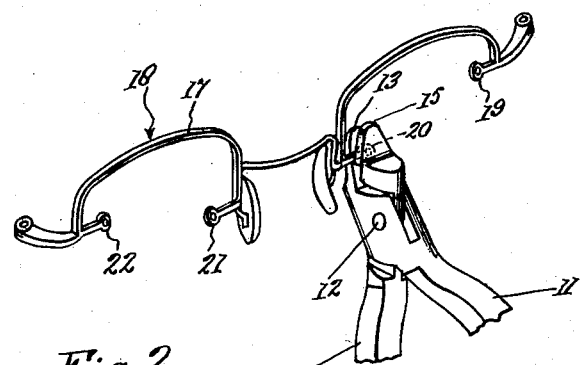
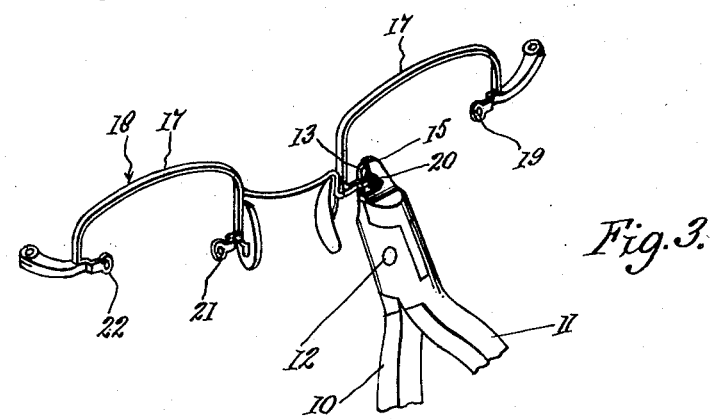
INVENTOR.
Bruce R. Vent
BY
Thomas F. Healy
Attorney Patented May 8, 1951

2,552,021

UNITED STATES PATENT OFFICE 2,552,021

OPTICIAN'S STRAP PLIERS

Bruce R. Vent, Lagrange, Ind.

Application April 10, 1946, Serial No. 660,930

4 Claims. (Cl. 81—3.6)

The present invention relates to a novel optician's plier, and more particularly to a strap plier by means of which an optician can perform several operations with one plier.

I am aware of U. S. Patent No. 1,412,520 to Philip N. Hansen. This Hansen patent shows an optician's plier which is adapted for many operations in making bends necessary to the purpose of proper adjustment of frames and lenses. However, the Hansen plier is unsuitable and awkward as a strap plier, particularly in operation on such mountings where several straps are crimped to space the lenses from the frame.

Accordingly, it is the object of my invention to provide a pair of optician's pliers which is suitable to perform all the operations of the Hansen plier, and in addition is suitable as a strap plier for all conventional mountings.

Another object of this invention is to provide an optician's plier which is easy to manipulate and saves the optician's time in adjusting frames for mounting lenses.

A further object of this invention is to provide a pair of strap pliers comprising, two jaws movable with respect to each other and tapered toward the tips thereof, with one of said jaws having a raised lip or portion extending around the front edge and along the side edges thereof, and with the other tapered jaw being adapted to seat in the recess formed by the raised lip of the first mentioned jaw.

Still another object of this invention is to provide a pair of strap pliers comprising two jaws movable with respect to each other and tapered toward the tips thereof, with one of said jaws having a raised lip extending around the front edge and along the side edges thereof, and the other tapered jaw being adapted to seat in the recess formed by the raised lip of the first mentioned jaw, with said second mentioned jaw terminating short of the raised lip on the front and side edges of the first mentioned jaw to provide a clearance which is useful in bending wires, straps, or the like, on eye glass frames into any desirable shape.

Other objects and advantages of this invention will be apparent from the following description thereof, and from the claims appended thereto.

In the drawing, wherein like numerals refer to like or corresponding parts throughout the several views:

Figure 1 depicts a top plan of a pair of glasses showing the lens mounted to the frame, Figure 2 shows an eye glass frame with the straps in uncrimped position, with the pliers positioned preparatory to crimping, Figure 3 shows the eye glass frame of Figure 2, with the straps in crimped position, and illustrating how the pliers are positioned to crimp the various straps.

Figure 4:
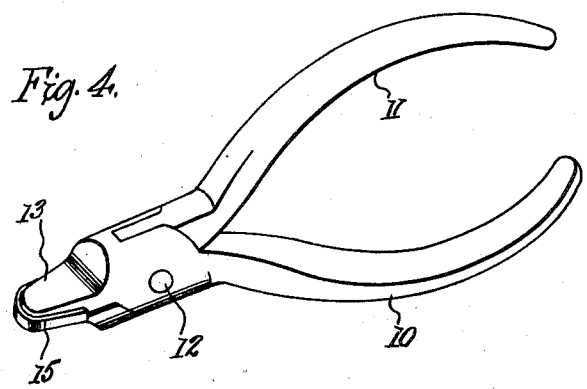
Figure 4 is a perspective view of the pliers in closed position.
Figure 5:
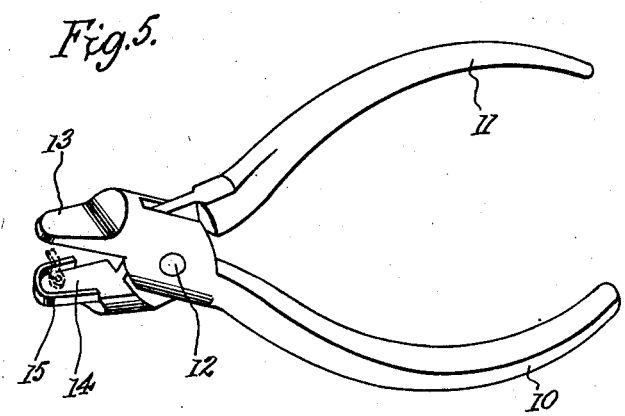
Figure 5 is a perspective view of the pliers, in open position, showing the position of a strap member after it has been crimped.
Figure 6:
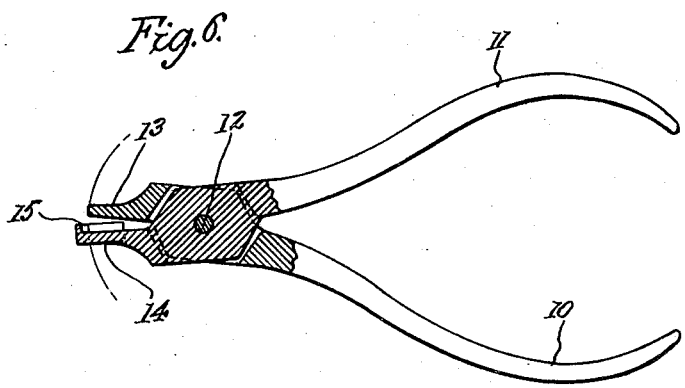
Figure 6 is a plan view of the pliers, partly in section, showing the upper jaw as terminating short of the front lip on the lower jaw.

Referring now to the drawing, and more particularly to Figures 4, 5 and 6, there is shown a pair of optician's pliers constructed with the usual handles 10 and 11, crossing each other at the usual pivot 12 and terminating in tapered jaws 13 and 14, with said jaws being reduced from the heel thereof to the tip.

The jaws 13 and 14 may be of any geometrical shape, but it is preferred that they taper, so that the area at the tip of the jaws 13 and 14 is less than the area at the heel thereof. If desired, the jaws may be flat, or assume a conical form, similar in shape to the jaws 4 and 5 of the Hansen pliers as shown in U. S. Patent No. 1,412,520.

The primary feature of my invention is to provide the lower jaw 14 with a raised portion or lip 15 which preferably extends along one side edge of the jaw 14 around the front edge or tip thereof, and along the other edge of said jaw 14. This lip 15 may be integral with said jaw 14, and constructed as a part thereof. If preferred, the lip 15 need only extend along the side edges of the jaw 14, and need not extend around the tip or front edge of said jaw 14.

In my preferred construction, the jaw 13 is adapted to seat in the recess formed by the lip 15 disposed on the jaw 14, preferably in spaced relation with said lip 15, to provide a slight clearance between the side edges and front edge of the jaw 14 as the jaw 13 is disposed in seated position, or when the pliers are in closed position as shown in Figure 4.

The pliers which form the present invention are suitable for all the uses as set forth in the Hansen Patent #1,412,520. As these uses are conventional and known to the art, I will not set them forth in detail.

In addition to the uses to which the Hansen pliers may be put, the pliers which form the present invention, are particularly adaptable for crimping straps in mountings, preparatory to mounting the lens. The crimping is effected so that lenses 16, as best shown in Figure 1, may be spaced from the temple-supporting members 17, so as to reduce lens breakage.

In the operation of mounting the lenses to a conventional rimless frame, said frame which is designated generally as 18 is first positioned as shown in Figure 2. The frame 18 comprises, inter alia, four strap members 19, 20, 21 and 22. These strap portions 19, 20, 21 and 22, as shown in Figure 2, are unbent or uncrimped. Before attaching the lenses 16 thereto, it is necessary that the said strap members be crimped, so that when the lenses 16 are secured thereto, said lenses 16 are spaced away from the temple-supporting members 17.

In the operation of the pliers, strap member 19 is first gripped with the pliers, and the upper jaw 13 of the pliers is disposed in closed position, so as to crimp the strap 19 in a suitable manner. It is to be noted that in crimping strap 19 one side edge of the lip 15 is employed.

The pliers are now moved to strap 20, which is similarly crimped as was strap 19. It is to be noted that the opposite edge of the lip 15 is employed in the crimping step, when crimping strap 20, than was employed in crimping strap 19.

Strap 21 is gripped similarly to strap 19 and crimped. Strap 22 is gripped similarly to strap 20 and crimped.

Thus it can be seen that the entire strap crimping period comprises four operations which take place in a comparatively short time, and this cannot be accomplished with any other pliers known in the art.

The front portion of lip 15 is employed when it is desired to crimp the straps of the mounting, or to make other adjustments on the mounting, by holding the pliers lengthwise of the mounting where it is awkward to employ the side edge portions of lip 15.

Figure 3 shows the frame of Figure 2, wherein the straps 19, 20, 21 and 22 have been bent or crimped, preparatory to securing the lens 16 thereto.

Various modifications of this invention will be apparent to those skilled in the art without departing from the spirit thereof, and it is desired to be limited only by the scope of the appended claims.

What I claim is:

1. Optician's pliers comprising two jaws, one of said jaws having an uninterrupted substantially flat surface opposed to the other of said jaws, the said one jaw having a raised portion along the opposite side edges thereof, said raised portion comprising spaced apart sides disposed at substantially right angles to said uninterrupted surface, whereby said uninterrupted surface and said sides form a recess, said other jaw having a width less than the distance between said sides of the recess so that when said other jaw is received by said recess a space is provided between each edge of said other jaw and the adjacent side of the recess.

2. Optician's pliers as claimed in claim 1 characterized by the fact that said jaws are tapered toward the tips thereof and that the opposite side edges of said other jaw are substantially parallel to the sides of said recess.

3. Optician's pliers as claimed in claim 1 characterized by the fact that said one jaw is also provided with a raised portion along its forward edge which joins with the raised portions at the side edges of said one jaw to form a continuous lip, and that the forward edge of said other jaw terminates short of the forward raised portion of said one jaw to provide a clearance therebetween.

4. Optician's strap pliers comprising, two jaws movable with respect to each other and tapered toward the front tips thereof, both of said jaws having an uninterrupted substantially flat inner face, said inner faces abutting each other when the jaws are in closed position, one of said jaws having a raised lip extending around the front edge and along the side edges thereof, the other tapered jaw being adapted to seat in the recess formed by the said raised lip when said jaws are in closed position, and said other tapered jaw terminating short of the raised lip on the front and side edges of said lipped jaw to provide a clearance.

BRUCE R. VENT.

REFERENCES CITED

The following references are of record in the file of this patent:

UNITED STATES PATENTS

| Number | Name | Date |
| --- | --- | --- |
| 190,642 | Stouffer | May 8, 1877 |
| 851,906 | Strassburger | Apr. 30, 1907 |
| 1,122,720 | Funk | Dec. 29, 1914 |
| 1,412,520 | Hansen | Apr. 11, 1922 |
| 1,602,119 | Niebaum | Oct. 5, 1926 |
| 1,619,084 | Miller | Mar. 1, 1927 |